United States Patent
Gandhi et al.

(10) Patent No.: US 10,640,033 B1
(45) Date of Patent: May 5, 2020

(54) ADJUSTING VEHICLE HEADLIGHTS

(71) Applicant: Toyota Motor Engineering & Manufacturing North America, Inc., Plano, TX (US)

(72) Inventors: Umesh N. Gandhi, Farmington Hills, MI (US); Danil V. Prokhorov, Canton, MI (US); Michael Paul Rowe, Pinckney, MI (US); Ryohei Tsuruta, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/929,073

(22) Filed: Dec. 18, 2018

(51) Int. Cl.
   B60Q 1/08 (2006.01)
   B60Q 1/076 (2006.01)

(52) U.S. Cl.
   CPC ............. B60Q 1/085 (2013.01); B60Q 1/076 (2013.01); B60Q 2300/132 (2013.01)

(58) Field of Classification Search
   CPC .... B60Q 1/143; B60Q 1/085; B60Q 2300/45; B60Q 1/0023; B60Q 1/08; B60Q 2300/132; B60Q 1/0041; B60Q 1/076; B60Q 1/10; B60Q 2300/134; B60Q 2200/38; B60Q 5/005
   USPC .................................................. 362/464–468
   See application file for complete search history.

(56) References Cited

U.S. PATENT DOCUMENTS

| | | |
|---|---|---|
| 5,331,251 A | 7/1994 | Marois |
| 5,414,335 A | 5/1995 | Sato |
| 5,639,155 A | 6/1997 | Kowall et al. |
| 5,957,563 A | 9/1999 | Moore |
| 6,305,823 B1 | 10/2001 | Toda et al. |

(Continued)

FOREIGN PATENT DOCUMENTS

| | | |
|---|---|---|
| JP | 2007097292 A | 4/2007 |
| WO | 2018175741 A1 | 9/2018 |

OTHER PUBLICATIONS

Acome et al., "Hydraulically Amplified Self-Healing Electrostatic Actuators with Muscle-Like Performance," Science, vol. 359, Issue 6371, pp. 61-65 (Jan. 5, 2018) (6 pages).

(Continued)

*Primary Examiner* — William J Carter
(74) *Attorney, Agent, or Firm* — Christopher G. Darrow; Darrow Mustafa PC

(57) ABSTRACT

A headlight assembly can include a headlight and one or more actuators operatively positioned to cause the position and/or orientation of the headlight to be adjusted. The one or more actuators include a bladder. The bladder can include a flexible casing. The bladder can define a fluid chamber. The fluid chamber can contain a dielectric fluid. The one or more actuators can include a first conductor and a second conductor operatively positioned on opposite portions of the bladder. The one or more actuators can be configured such that, when electrical energy is supplied to the first conductor and the second conductor, the first conductor and the second conductor can become oppositely charged. As a result, the first conductor and the second conductor are electrostatically attracted toward each other to cause at least a portion of the dielectric fluid to be displaced to an outer peripheral region of the fluid chamber.

20 Claims, 7 Drawing Sheets

(56) References Cited

U.S. PATENT DOCUMENTS

| | | |
|---|---|---|
| 6,490,960 B1 | 12/2002 | Jackson et al. |
| 7,275,846 B2 | 10/2007 | Browne et al. |
| 10,293,718 B1 | 5/2019 | Ilievski et al. |
| 2007/0046074 A1 | 3/2007 | Satta et al. |
| 2007/0263398 A1 | 11/2007 | Mizuno |
| 2009/0086331 A1* | 4/2009 | Gunasekaran ............ G02B 1/06 359/666 |
| 2011/0188258 A1* | 8/2011 | Tajima ................... B60Q 1/076 362/524 |
| 2012/0287493 A1* | 11/2012 | Kuhlman ............... B60Q 1/085 359/228 |
| 2013/0304049 A1 | 11/2013 | Behnke, II et al. |
| 2015/0331156 A1* | 11/2015 | Hirsa ....................... G02B 3/14 359/666 |
| 2016/0106620 A1 | 4/2016 | Uno et al. |
| 2017/0150252 A1 | 5/2017 | Trestain et al. |
| 2018/0036198 A1 | 2/2018 | Mergl et al. |
| 2018/0339624 A1 | 11/2018 | Leck |
| 2019/0023161 A1 | 1/2019 | Sullivan et al. |
| 2019/0059608 A1 | 2/2019 | Yan et al. |
| 2019/0232822 A1 | 8/2019 | Hintermaier |

OTHER PUBLICATIONS

<Knoss, "Next-gen flexible robots move and heal like us," CU Boulder Today, Jan. 4, 2018, retrieved from the Internet: <https://www.colorado.edu/today/2018/01/04/next-gen-flexible-robots-move-and-heal-us>, [retrieved Mar. 30, 2018] (6 pages).

* cited by examiner

ADJUSTING VEHICLE HEADLIGHTS

FIELD

The subject matter described herein relates to vehicle headlights and, more particularly, to the adjustment of vehicle headlights.

BACKGROUND

Modern travel is dependent upon land travel in all conditions and at all times of day. However, such travel may be dangerous when the driver cannot adequate observe the contours of the road or obstacles on the road. For example, at night, a driver may not see obstacles in the road or the contours of the road without illumination. Therefore, land vehicles are generally equipped with headlights in order to adequately create such illumination and to ensure that the driver is able to properly follow the road and see obstacles in time to take evasive action.

SUMMARY

In one respect, the subject matter presented herein is directed to a headlight assembly. The headlight assembly can include a headlight and one or more actuators operatively positioned to cause a position and/or an orientation of the headlight to be adjusted. The one or more actuators can include a bladder. The bladder can include a flexible casing and can define a fluid chamber. The fluid chamber includes a dielectric fluid. The one or more actuators can include a first conductor and a second conductor operatively positioned on opposite portions of bladder. The one or more actuators can be configured such that, when electrical energy is supplied to the first conductor and the second conductor, the first conductor and the second conductor can become oppositely charged. As a result, the first conductor and the second conductor can be electrostatically attracted toward each other, which, in turn, can cause at least a portion of the dielectric fluid to be displaced to an outer peripheral region of the fluid chamber.

In another respect, the subject matter presented herein is directed to a headlight system. The system can include a base and a headlight operatively connected to the base. The system can include one or more actuators operatively connected to the base. The one or more actuators can include a bladder. The bladder can include a flexible casing and can define a fluid chamber. The fluid chamber can include a dielectric fluid. The one or more actuators can include a first conductor and a second conductor operatively positioned on opposite portions of bladder. The one or more actuators can be configured such that, when electrical energy is supplied to the first conductor and the second conductor, the first conductor and the second conductor have opposite charges. As a result, the first conductor and the second conductor can be electrostatically attracted toward each other such that cause at least a portion of the dielectric fluid is displaced to an outer peripheral region of the fluid chamber. The one or more actuators can be operatively positioned to adjust a position and/or an orientation of the headlight. The system can include a power source operatively connected to supply electrical energy to first conductor and the second conductor. The system can include one or more processors operatively connected to selectively control a supply of electrical energy from the power source to the first conductor and the second conductor.

In yet another respect, the subject matter presented herein is directed to a method of adjusting a vehicle headlight. The method can include detecting a headlight trigger. The method can include, responsive to detecting a headlight trigger, determining a target headlight position or orientation based on the headlight trigger. The method can include causing one or more actuators to actuate to alter a position or orientation of the headlight to the target headlight position or orientation. The actuator(s) can include a flexible casing that defines a fluid chamber. The fluid chamber can include a dielectric fluid. The one or more actuators can include a first conductor and a second conductor operatively positioned on opposite portions of bladder. The one or more actuators can be configured such that, when electrical energy is supplied to the first conductor and the second conductor, the first conductor and the second conductor have opposite charges. As a result, the first conductor and the second conductor can be electrostatically attracted toward each other such that cause at least a portion of the dielectric fluid is displaced to an outer peripheral region of the fluid chamber.

DETAILED DESCRIPTION

Arrangements described herein are generally related to the headlights of a vehicle. The headlights can be actuated to change the position and/or the orientation of the headlights to attain a desired beam direction and/or illumination pattern of the headlights. The position and/or the orientation of the headlights can be altered using one or more actuators operatively positioned with respect to the headlight. The actuators can include a bladder defining a fluid chamber that contains a dielectric fluid. The actuators can include a first conductor and a second conductor operatively positioned on opposite portions of the bladder. The actuators can be configured such that, when electrical energy is supplied to the first conductor and the second conductor, they are electrostatically attracted toward each other. As a result, at least a portion of the dielectric fluid to be displaced to an outer peripheral region of the fluid chamber, causing the region to bulge.

Figure 1:
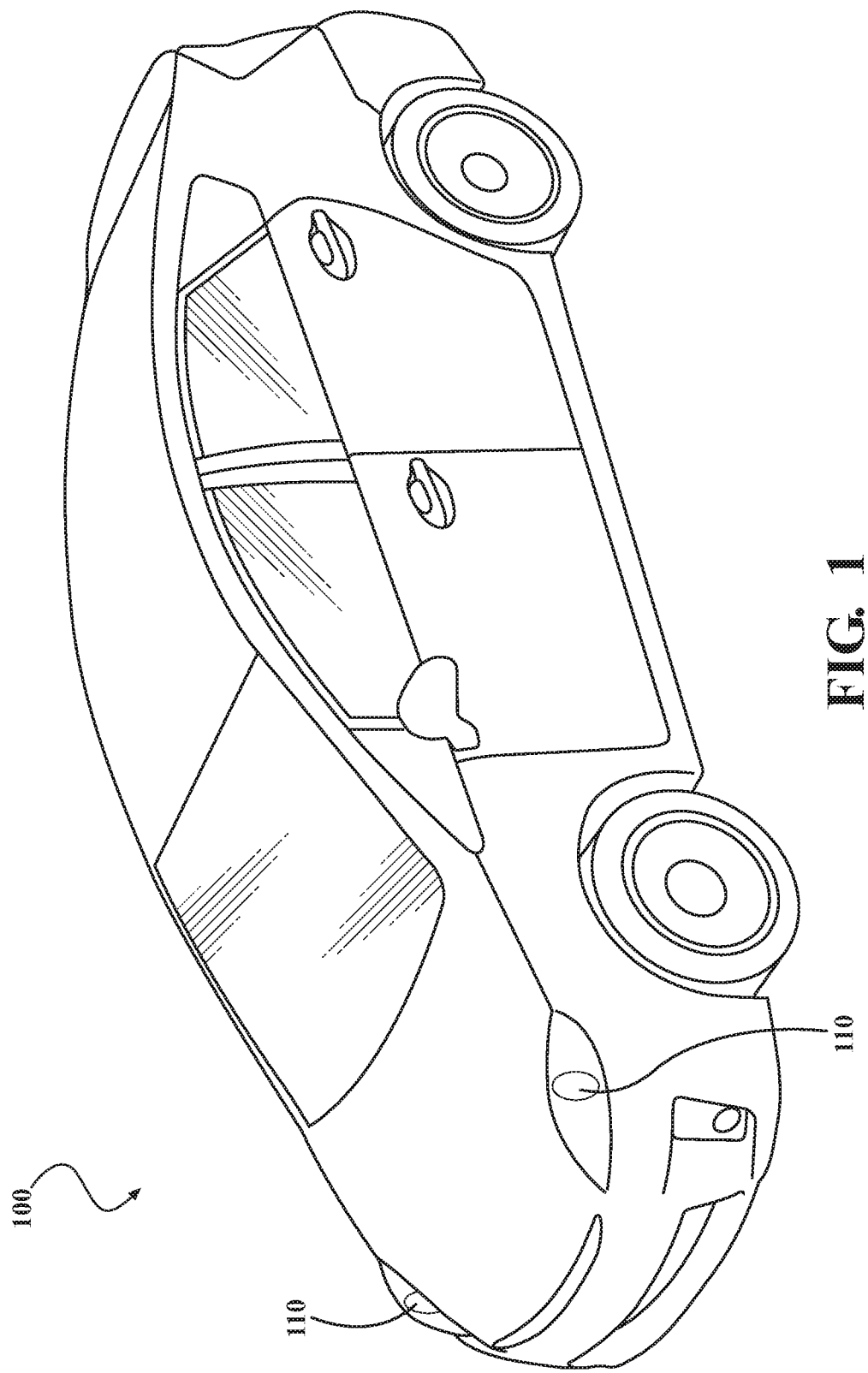
FIG. 1 is a view of an example of a vehicle.

Referring to FIG. 1, an example of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle may be a watercraft, an aircraft or any other form of motorized transport.

The vehicle 100 can have an autonomous operational mode and/or a semi-autonomous operational mode. For instance, the vehicle 100 can have an autonomous operational mode in which or more computing systems are used to navigate and/or maneuver the vehicle along a travel route with no input or supervision required from a human driver. The vehicle 100 can have one or more semi-autonomous operational modes in which a portion of the navigation and/or maneuvering of the vehicle along a travel route is performed by one or more computing systems, and a portion of the navigation and/or maneuvering of the vehicle along a travel route is performed by a human driver. The vehicle 100 can have a manual operational mode in which all of or a majority of the navigation and/or maneuvering of the vehicle is performed by a human driver. In one or more arrangements, the vehicle 100 can be a conventional vehicle that is configured to operate in only a manual mode.

In one or more arrangements, the vehicle 100 can include one or more headlights 110. While exemplified as two headlights 110 in FIG. 1, there may be any number of headlights 110, including one, two, three, four, five, six, eight, ten, twelve, or more. According to arrangements herein, the headlights 110 can be selectively actuated independently of each other, or they may be actuated in groups, including but not limited to one collective group. The headlights 110 can move and be controlled independently from one another for various purposes and utilities.

The headlights 110 can be adjusted on one or more axes. For example, the headlights 110 can be adjusted (e.g., rotating, tilting, etc.) relative to a substantially vertical axis (e.g., yaw axis) to control which lateral direction the beams of the headlights 110 shine. This can allow lateral control of the one or more headlights 110 independent of the overall heading of vehicle 100. Example utilities include using one or more headlights 110 as a spotlight or diverting the beams of the headlights 110 from oncoming traffic. As another example, the headlights can be adjusted (e.g. rotating, tilting, etc.) relative to a substantially horizontal axis (e.g., pitch axis which is a horizontal axis substantially perpendicular to a longitudinal direction of the vehicle). The term "longitudinal direction of the vehicle" means an axis going through the center of the vehicle, extending through the front end and the back end of the vehicle. In some instances, the headlights 110 can be adjusted by extending and/or retracting substantially in a longitudinal direction of the vehicle.

In one or more arrangements, the headlights 110 may change adjust on their pitch axis and/or other axis to maintain a constant illumination distance. For instance, when the vehicle 100 crests the top of the hill, the angle of the vehicle 100 relative to the upcoming road is different than if the road is flat and the vehicle 100 (e.g., the longitudinal axis of the vehicle 100) is substantially parallel to the road. In this circumstance, the pitch angle of one or more headlights 110 can be adjusted to maintain a substantially constant illumination distance. As used herein, the term "substantially" includes exactly the term it modifies and slight variations therefrom. For instance, the term "substantially parallel" means exactly parallel and slight variations therefrom. Slight variations therefrom can include being within about 10 degrees/percent/units or less, within about 5 degrees/percent/units or less, within about 4 degrees/percent/units or less, within about 3 degrees/percent/units or less, within about 2 degrees/percent/units or less, or within about 1 degrees/percent/unit or less. In some instances, "substantially" can include being within normal manufacturing tolerances.

Referring to FIGS. 3A-3D, various views of an example of a headlight assembly 300 is depicted. It will be understood that it is not necessary for the headlight assembly 300 to have all of the elements shown in FIGS. 3A-3D or described herein. The headlight assembly 300 can have any combination of the various elements shown in FIG. 3. Further, the headlight assembly 300 can have additional elements to those shown in FIG. 3. In some arrangements, the headlight assembly 300 may not include one or more of the elements shown in FIG. 3. Still further, the various elements depicted in FIG. 3 can be arranged in ways other than which is shown in FIG. 3.

The headlight assembly 300 can include a headlight 310. The headlight 310 can be any headlight, now known or later developed. The headlight 310 can include one or more lamps and/or a housing. The lamp(s) can generate or emit any type of light energy. The housing can help protect the lamp, provide a desired aesthetic appearance, and/or facilitate securing the headlight assembly to the vehicle. In some instances, the headlight 310 can include a mirror or reflector to reflect stray light in a forward direction to maximize light projected. At least a portion of the housing, such as in a forward direction when installed on a vehicle, can be substantially transparent or highly translucent such that light may pass through with little or no loss.

In some arrangements, the headlight assembly 300 can include a base 320. The headlight 310 can be operatively connected to the base 320. The term "operatively connected," as used throughout this description, can include direct or indirect connections, including connections without direct physical contact. In some instances, the headlight 310 and the base 320 can be fixedly connected together, such that relative motion between the two components can be minimized. The headlight 310 can be operatively connected to the base 320 in any suitable manner, such as one or more fasteners, one or more adhesives, and/or one or more forms of mechanical engagement, just to name a few possibilities.

The base 320 may be made of any suitable material. For instance, the base 320 can be made of a rigid material. The base 320 can be made of a material with a high tensile strength that is resilient to stretching or bending, such as plastic or metal. In some arrangements, the base 320 may be integrated with a back wall of the housing, behind the mirror, such that the base 320 and the back wall of the housing are the same piece of material. The base 320 can be any suitable shape. For example, the base 320 can be square, quadrilateral, triangle, rectangular, pentagonal, hexagonal, octagonal, a polygon, circular, ovular, annular, lunar, or semi-circular. The base 320 can be a substantially planar structure, as shown in FIGS. 3A-3D. However, it will be appreciated that the base 320 can be any of a variety of non-planar shapes. The headlight 310 can be operatively positioned at any suitable position relative to the base 320. For example, the headlight 310 can be centrally positioned the base 320, or the headlight 310 can be located in an offset position on the base 320. In some embodiments, the headlight assembly 300 may not include a base.

The headlights may be adjusted to change their illumination pattern for any useful purpose. For example, the headlights' angle may be adjusted to prevent blinding oncoming traffic, a pedestrian, or a bicyclist. The headlights may be adjusted to illuminate roadside features of interests, including but not limited to animals, pedestrians, bicyclists, stopped cars, emergency vehicles, felled trees and power lines, hazards, driveways, and exit lanes. The headlights may be adjusted in response to changing load conditions of the vehicle, such as when carrying heavy objects and/or pulling a trailer. In some embodiments, it may be beneficial to control headlights independent from one another.

The headlight assembly 300 can include one or more actuators 330. The one or more actuators can be operatively positioned to cause a change in the position and/or the orientation of the headlight 310. In one or more arrangements, a plurality of actuators 330 can be operatively positioned on a side of the base 320. In the example shown in FIGS. 3A-3D, there can be four actuators 330. However, it will be understood that there can be more or fewer actuators. Each actuator 330 can additionally be operatively connected to the vehicle 100. In some instances, such as where there is no base, the actuators 330 may be operatively positioned to directly contact the headlight 310.

Figure 3A:
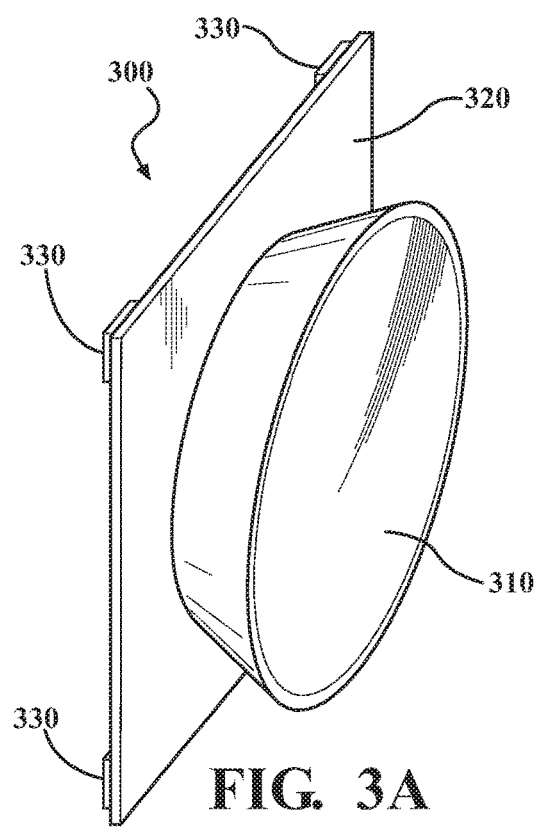
FIGS. 3A-3D present various views of an example of a headlight assembly.
Figure 3B:
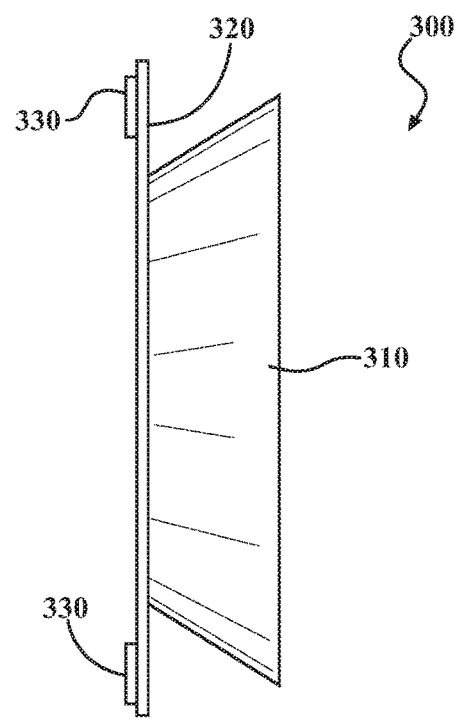
Figure 3C:
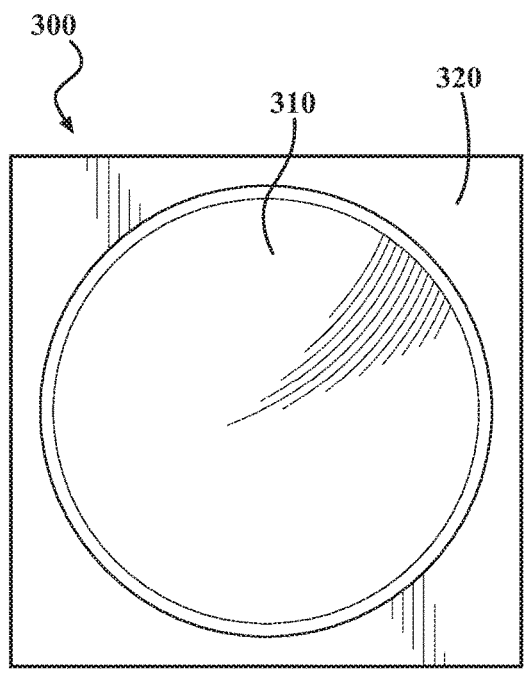
Figure 3D:
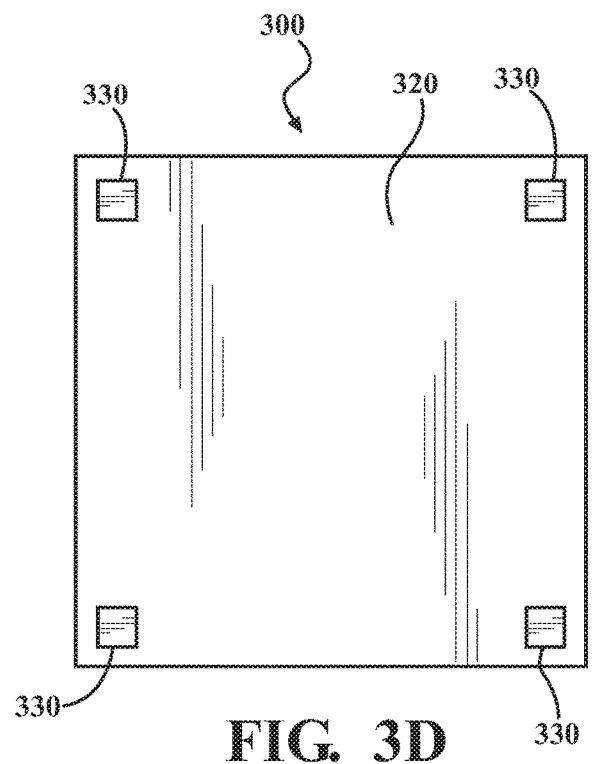

The actuators 330 can be independently actuated, the actuators 330 may actuate together, or the actuators 330 may actuate in any other manner to cause a desired movement of the headlight 310. Various combinations of selective actuation and non-actuation of the actuators 330 is possible that would allow for various configurations for the headlight and the resulting light beam projected from the vehicle. For example, if the two actuators 330 on the left in FIG. 3D are actuated but the two actuators on the right in FIG. 3D are not actuated, the base 320 will yaw to the right, adjusting the beam of the headlight 310 to the right. In countries where drivers drive on the right side of the road, this would angle the beam away from opposing traffic and toward the shoulder of the road. This feature could be used to prevent shining the light beam into oncoming traffic or to illuminate the road's shoulder. Alternatively, if the two left actuators 330 were not actuated and the two right actuators 330 were actuated, then the beam would point left. As a further example, if the top two actuators 330 in FIG. 3D were actuated and the bottom two actuators 330 were not actuated, then the beam from the headlight 310 would point in a generally downward direction. On the other hand, if the top two actuators 330 were not actuated and the bottom two actuators 330 were actuated, then the beam from the headlight 310 would point in a generally upward direction. The terms top, bottom, left, and right are merely used relative to FIG. 3D. It will be understood that these terms are merely used for convenience to facilitate the discussion and are not intended to be limiting.

In some arrangements, the housing can be fixed inside of a vehicle, and the actuators 330 connect the back of the mirror to the back wall of the housing, such that the actuators 330 only control the mirror within the housing and cause the mirror to move around the headlight 310, thereby changing the illumination projection. Alternatively, the actuators 330 can cause the mirror and light fixed assembly to rotate within the housing. In so doing, the beam can be modified without rotating the entire housing.

The arrangements shown in FIGS. 3A-3D control the headlight 310 with a plurality of actuators 330, one in each corner region of the base 320. The base 320 may also have other shapes that may or may not have a corner (e.g., a circle). In the arrangements shown in FIGS. 3A-3D, it will be appreciated that some corner regions may not have an actuator 330, or some corner regions may have more than one actuator 330. There can be additional structures associated with the base 320 to facilitate movement by the actuators 330, such as hinges or pivot joints.

Figure 2:
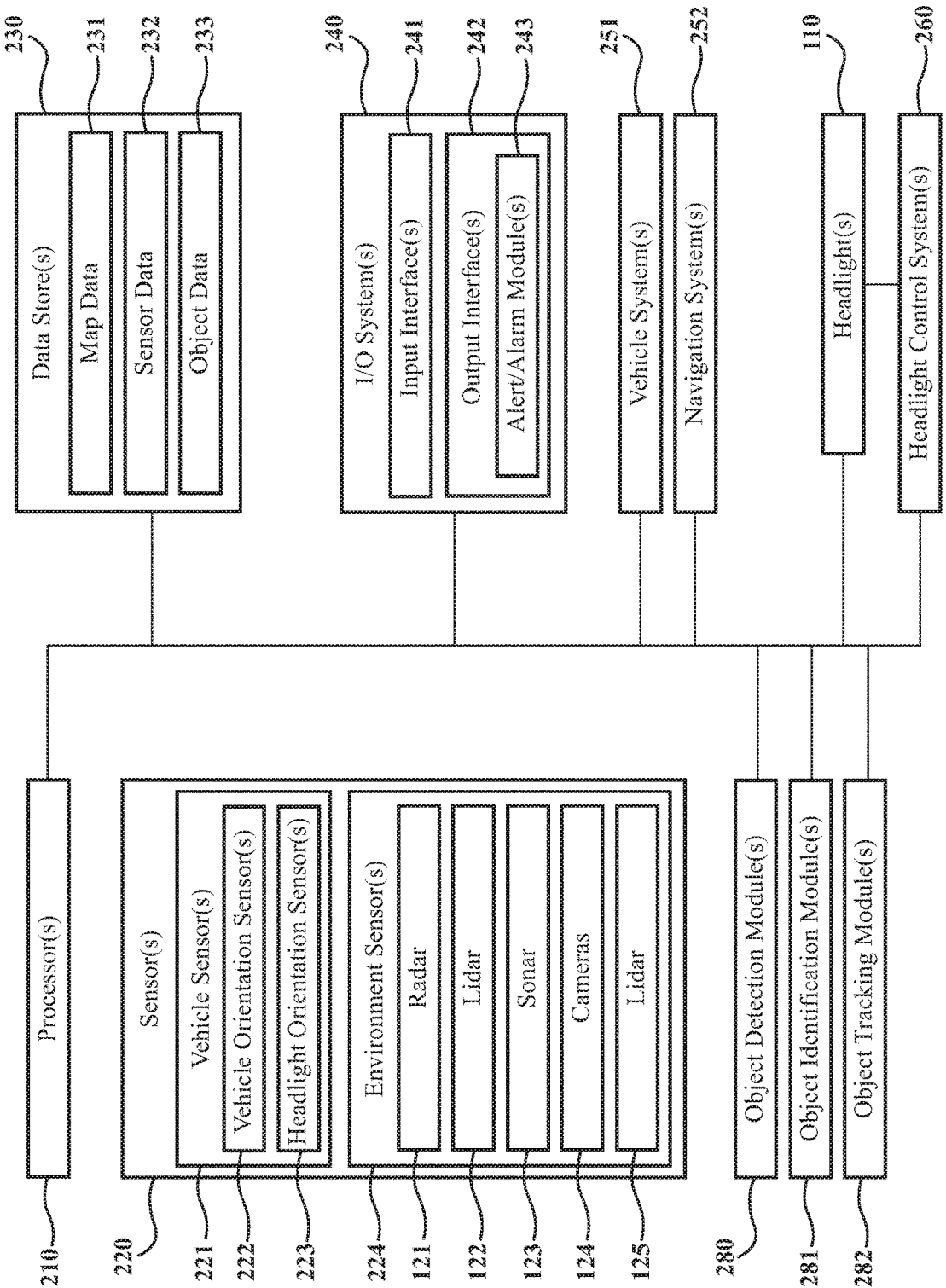
FIG. 2 is a view of various examples of elements of the vehicle.

The vehicle 100 can include various elements. Some of the possible elements of the vehicle 100 are shown in FIG. 2 and will now be described. It will be understood that it is not necessary for the vehicle 100 to have all of the elements shown in FIG. 2 or described herein. The vehicle 100 can have any combination of the various elements shown in FIG. 2. Further, the vehicle 100 can have additional elements to those shown in FIG. 2. In some arrangements, the vehicle 100 may not include one or more of the elements shown in FIG. 2. Further, while the various elements may be shown as being located on or within the vehicle 100 in FIG. 2, it will be understood that one or more of these elements can be located external to the vehicle 100. Thus, such elements are not located on, within, or otherwise carried by the vehicle 100. Further, the elements shown may be physically separated by large distances. Indeed, one or more of the elements can be located remote from the vehicle 100.

The vehicle 100 can include one or more processors 210, one or more sensors 220 (e.g., vehicle sensors 221 and/or environment sensors 224), data store(s) 230, one or more I/O systems 240, autonomous driving module(s) 250, one or more vehicle systems 251, navigation systems 252, headlight control system(s) 260, communication network 270, object detection module(s) 280, object identification module(s) 281, and object tracking module(s) 282.

As noted above, the vehicle 100 can include one or more processors 210. "Processor" means any component or group of components that are configured to execute any of the processes described herein or any form of instructions to carry out such processes or cause such processes to be performed. The processor(s) 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 210 can include at least one hardware circuit (e.g., an integrated circuit) configured to carry out instructions contained in program code. In arrangements in which there is a plurality of processors 210, such processors can work independently from each other or one or more processors can work in combination with each other. In one or more arrangements, one or more processors 210 can be a main processor(s) of the vehicle 100. For instance, one or more processors 210 can be electronic control unit(s) (ECU).

The vehicle 100 can include one or more power supplies. The one or more power supplies can be any suitable source of electrical power for the headlight assembly 300. In one or more arrangements, the power supply can include one or more batteries. Alternatively or in addition, the power supply can include one or more engines and/or one or more generators. The one or more power supplies can be operatively connected to supply and/or selectively supply electrical energy to the headlight assembly 300 or one or more components thereof.

The vehicle 100 can include one or more sensors 220. "Sensor" means any device, component and/or system that can detect, determine, assess, monitor, measure, quantify, acquire, and/or sense something. The one or more sensors 220 can detect, determine, assess, monitor, measure, quantify, acquire, capture, and/or sense in real-time. As used herein, the term "real-time" means a level of processing responsiveness that a user or system senses as sufficiently immediate for a particular process or determination to be made, or that enables the processor to keep up with some external process.

In arrangements in which there is a plurality of sensors 220, the sensors 220 can work independently from each other. Alternatively, two or more of the sensors 220 can work in combination with each other. In such case, the two or more sensors can form a sensor network. The one or more sensors 220 can be operatively connected to the processor(s) 210, the data store(s) 230, other elements of the vehicle 100, including any of the elements shown in FIG. 2 and/or other elements.

The sensor(s) 220 can include any suitable type of sensor. Various examples of different types of sensors will be described herein. However, it will be understood that the embodiments are not limited to the sensors described.

The sensor(s) 220 can include one or more vehicle sensors 221. The vehicle sensor(s) 221 can detect, determine, assess, monitor, measure, quantify, capture, and/or sense information about the vehicle 100 itself (e.g., position, orientation, yaw, pitch, speed, vehicle loading conditions, trailer connection, tire pressure, etc.). In one or more arrangements, the vehicle sensors 221 can include one or more vehicle orientation sensors 222 and one or more headlight orientation sensors 223.

The vehicle orientation sensors 222 can detect, determine, assess, monitor, measure, quantify, and/or sense information about the vehicle 100 itself, such as its location and/or orientation. For example, the vehicle orientation sensors 222 may include a global positioning system (GPS) data that can determine where on the Earth the vehicle is presently located. The vehicle orientation sensors 222 can determine the orientation of the vehicle 100 in a plurality of directions.

The headlight orientation sensors 223 can detect, determine, assess, monitor, measure, quantify, and/or sense information about the physical orientation of the headlights of vehicle 100. For example, the headlight orientation sensors 223 may detect the yaw and/or pitch of the headlights of the vehicle 100.

Alternatively or in addition, the vehicle 100 can include one or more environment sensors 224. The environment sensors 224 configured to detect, determine, assess, monitor, measure, quantify, acquire, and/or sense data or information about the external environment in which a vehicle is located or one or more portions thereof. For example, the one or more environment sensors 224 can detect, determine, assess, monitor, measure, quantify, acquire, capture, and/or sense obstacles in at least a portion of the external environment of the vehicle 100 and/or information/data about such obstacles. Such obstacles may be stationary objects and/or dynamic objects. The one or more environment sensors 224 can detect, determine, assess, monitor, measure, quantify, acquire, and/or sense other things in the external environment of the vehicle 100, such as, for example, lane markers, signs, traffic lights, traffic signs, lane lines, crosswalks, curbs proximate the vehicle 100, off-road objects, etc.

Environment information being sensed can include distance to objects; data about objects, such as velocity, acceleration, mass, angle of movement relative to vehicle 100, size, shape, color, etc.; information about the road; traffic information; communication sensors (including transmitters); information about traffic signals or signs; and similar. The environmental sensors may be located at any point on vehicle 100 that allows the sensor to properly sense its intended environment.

In one or more arrangements, the environment sensors 224 can include one or more radar sensors 121, one or more lidar sensors 122, one or more sonar sensors 123, one or more cameras 124, and/or one or more ranging sensors 125. Additionally, other environmental sensors can be present, such as one or more light sensor(s) and/or one or more vehicle communication sensors. Such sensors can be used to detect, determine, assess, monitor, measure, quantify, acquire, and/or sense, directly or indirectly, something about the external environment of the vehicle 100.

The vehicle 100 can include one or more data stores 230 for storing one or more types of data. The data store 230 can include volatile and/or non-volatile memory. Examples of suitable data stores 230 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 230 can be a component of the processor(s) 210, or the data store 230 can be operatively connected to the processor(s) 210 for use thereby.

In one or more arrangements, the one or more data stores 230 can include map data 231. The map data 231 can include maps of one or more geographic areas. In some instances, the map data 231 can include information or data on roads, traffic control devices, road markings, street lights, structures, features, and/or landmarks in the one or more geographic areas. The map data 231 can be in any suitable form. The map data 116 can include measurements, dimensions, distances, positions, coordinates, and/or information for one or more items included in the map data 231 and/or relative to other items included in the map data 231. The map data 231 can include a digital map with information about road geometry. In one or more arrangement, the map data 231 can include information about the ground, terrain, elevation, roads, surfaces, and/or other features of one or more geographic areas. The map data 231 can be high quality and/or highly detailed.

In one or more arrangements, the one or more data stores 230 can include sensor data 232. The sensor data 232 can be raw data stored so that it can be reviewed by modules and systems for them to perform their functions. In one or more arrangements, the one or more data stores 230 can include object data 233. The object data 233 can include data about objects detected by object detection module(s) 280 or common objects that a vehicle may encounter while driving (e.g., vehicles, pedestrians, animals, trees, etc.). As objects are identified and tracked, object identification module(s) 281 and object tracking module(s) 282 may update object detection data with additional data and/or metadata. In some instances, the object data 233 can have metadata including when and how the object was identified. In one or more arrangement, the one or more data stores 230 can include a loading conditions correlation table that correlates loading conditions to headlight leveling settings. The correlation table may include, for example, relationships between different vehicle loading conditions and a headlight leveling setting. The level settings may include discrete values that may correspond to different orientations of headlight assembly 300.

The vehicle 100 can include an input interface 241. An "input interface" includes any device, component, system, element or arrangement or groups thereof that enable information/data to be entered into a machine. The input interface 241 can receive an input from a vehicle occupant (e.g. a driver or a passenger). Any suitable input interface 241 can be used, including, for example, a keypad, display, touch screen, multi-touch screen, button, joystick, mouse, trackball, microphone and/or combinations thereof.

The vehicle 100 can include an output interface 242. An "output interface" includes any device, component, system, element or arrangement or groups thereof that enable information/data to be presented to a vehicle occupant (e.g. a person, a vehicle occupant, etc.). The output interface 242 can present information/data to a vehicle occupant. The output interface 242 can include a display. Alternatively or in addition, the output interface 242 may include an earphone and/or speaker. Some components of the vehicle 100 may serve as both a component of the input interface 241 and a component of the output interface 242.

The vehicle 100 can include one or more alert or alarm module(s) 243. The alert module(s) 243 can cause an alert, message, warning, and/or notification to be presented via the output interface(s) 242. The alert module(s) 243 can cause any suitable type of alert, message, warning, and/or notification to be presented, including, for example, visual, audial, and/or haptic alerts, just to name a few possibilities. The alert module(s) 243 can be operatively connected to the output interface(s) 242, one or more vehicle systems 251, and/or components thereof to cause the alert to be presented. A visual warning can be presented by one or more components of the output interface(s) 242, such as on one or more displays or one or more lights. Alerts may be sent when the vehicle 100 detects danger, an imminent crash, an obstacle, or otherwise wishes to bring something to a driver's attention.

The vehicle 100 can include one or more vehicle systems 251. The one or more vehicle systems 251 can include a propulsion system, a braking system, a steering system, throttle system, a transmission system, a signaling system, and a navigation system. Each of these systems can include one or more mechanisms, devices, elements, components, systems, and/or combination thereof, now known or later developed. The above examples of the vehicle systems 251 are non-limiting. Indeed, it will be understood that the vehicle systems 251 can include more, fewer, or different vehicle systems. It should be appreciated that although particular vehicle systems are separately defined, each or any of the systems or portions thereof may be otherwise combined or segregated via hardware and/or software within the vehicle 100.

The navigation system(s) 252 can include one or more mechanisms, devices, elements, components, systems, applications and/or combinations thereof, now known or later developed, configured to determine the geographic location of the vehicle 100 and/or to determine a travel route for the vehicle 100. The navigation system 252 can include one or more mapping applications to determine a travel route for the vehicle 100. The navigation system 252 can include a global positioning system, a local positioning system, or a geolocation system.

The processor(s) 210 and/or the headlight control system(s) 260 can be operatively connected to communicate with the various vehicle systems 251 and/or individual components thereof. For example, the sensors(s) 220 may acquire data, which can be analyzed processed by processor(s) 210 in coordination with various modules, such as the object detection module(s) 280 and/or the object tracking module(s) 282. Relevant data and metadata can be stored in the sensor data 232, object data 233, and/or data store(s) 230. Data can be passed to the headlight control system(s) 260, which in conjunction with the processor(s) 210 may decide to autonomously adjust the headlights 110. Input factors detected by sensor(s) 220 that can determine the headlight(s) should be adjusted can include the terrain, such as the vehicle's pitch angle relative to the upcoming road; planned path; curves in the road; environmental conditions (e.g., the amount of fog and visibility in general and the amount of rain, snow, or other precipitation), vehicle loading conditions, identification of objects on the road or in the environment as a whole, such as identification of animals, vehicles, pedestrians, bicyclists, and vehicles operating with lights out; and loading conditions of the vehicle. The headlight control system 260 can determine a target headlight setting (e.g., position and/or orientation) based on these input factors. The headlight control system 260 can then send a control signal or communication signal via control circuit(s) 261 in order to adjust actuated headlight 110. In this manner, the processor(s) 210 and the headlight control system(s) 260 may control some or all of the actuated headlight(s) 110 and may adjust them.

The headlight control system(s) 260 may communicate with other components of the vehicle 100 for various purposes. For example, the scene identification module(s) 283 may detect an animal, and the headlight control system(s) 260 may illuminate the animal with one headlight, while the other provides illumination in front of the vehicle 100. In addition to being triggered by the scene identification module(s) 283, the headlight control system(s) 260 can use data supplied from the object tracking module(s) 282, which in turn relies upon object detection module(s) 280 to begin a tracking operation. Data from the object tracking module(s) 282 can be used to locate the tracked object relative to the vehicle 100. In this manner, the headlight control system(s) 260 determine how to actuate the headlights in order to illuminate the animal.

Additionally, the headlights 110 can be adjusted manually. For example, an automobile mechanic may adjust the headlights 110 to lower the beam distance of the headlight by inputting calibration information into the input interface(s) 241. In this manner, a vehicle—that has the tendency to blind oncoming cars before the headlights 110 adjust or in situations where the headlights 110 cannot change without causing safety concerns for the host vehicle—can prevent blinding oncoming cars. Alternatively, a driver may wish to spread out the beams of headlight more, so that they cover a greater angle in the upcoming terrain. This could be highly beneficial when off-roading at night, for example. In yet another embodiment, the headlight control system(s) 260 can use the I/O system(s) 240 to advise the driver or asks the driver for a manual confirmation, so that the changing headlights does not surprise or disorient the driver.

The headlight control system(s) 260 can be configured to analyze data from various sources. In some instances, the headlight control system(s) 260 can take into account competing priorities to ultimately determine whether and how the headlights 110 should be adjusted.

Various elements of the vehicle 100, such as data store(s) 230 and processor(s) 210, can be communicatively linked to one another or one or more other elements of the vehicle 100 through one or more communication networks 270. As used herein, the term "communicatively linked" can include direct or indirect connections through a communication channel, bus, pathway or another component or system. A "communication network" means one or more components designed to transmit and/or receive information from one source to another. The data store(s) 230 and/or one or more of the elements of the vehicle's digital logic system 130 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

The vehicle 100 can include one or more modules, at least some of which will be described herein. The modules can be implemented as computer readable program code that, when executed by a processor, implement one or more of the various processes described herein. One or more of the modules can be a component of the processor(s) 210, or one or more of the modules can be executed on and/or distributed among other processing systems to which the processor(s) 210 is operatively connected. The modules can include instructions (e.g., program logic) executable by one or more processor(s) 210. Alternatively or in addition, one or more data store 230 may contain such instructions. In another embodiment, instead of software implementations, the modules can be created exclusively using hardware, or alternatively as a combination of additional hardware with controllers with software therein.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more object detection modules 280. The object detection module(s) 280 can be configured to detect the presence of an object in the external environment. The object itself may not be directly detectable. The object detection module(s) 280 can detect the presence of an object in any suitable manner, such as by lidar, radar, vehicle communication, sonar, camera data, GPS data, position data, location data, and/or map data 231.

In addition to detecting the presence of an object, the object detection module(s) 280 can be configured to determine a distance between the object and the vehicle 100. These characteristics can be determined in any suitable manner, such as by ranging sensors 229, radar 225, lidar 226, sonar 227, camera 228 (which can include visual or infrared cameras), or any combinations of such techniques.

The vehicle 100 can include one or more object identification modules 281. The object identification module(s) 281 can be configured to determine the identity or nature of a detected object. The object identification module(s) 281 can determine the identity of an object in any suitable manner. In one or more arrangements, the detection can be compared to identifying features of an object, such as color measured visually, shape, size, movement, sounds, etc. In one or more arrangements, the object identification module(s) 281 can compare acquired object data to object data 233 for matches.

The vehicle 100 can include one or more object tracking modules 282. The object tracking module(s) 282 can be configured to determine a movement or trajectory of an object in any suitable manner. In one or more arrangements, the detection can be a time study of an object to determine its position, velocity, acceleration, and jerk factor. For instance, the identification can be performed by detecting when and where an object moves to build a model of how it moves, using environment sensors 224, such as ranging sensors 229, radar 225, lidar 226, sonar 227, camera 228, or any combinations of such techniques.

The object tracking module(s) 282 may communicate directly with the headlight control system(s) 260 when the headlight control system(s) needs to track an object such as an animal or oncoming traffic. Alternatively, object tracking module(s) 282 may store trajectory data in the object data 233 stored on data store 230 for use by the headlight control system(s) 260.

Referring to FIG. 4, an example of an actuator 400 is shown. The actuator 400 can have a body that is, at least in large part, made of a soft, flexible material. It will be understood that the description of the actuator 400 can apply to the actuators 330 shown in FIG. 3. The actuator 400 can include a bladder 440 containing a dielectric fluid 430. The bladder 440 can include a casing 445. The casing 445 can be made of a single piece of material, or a plurality of separate pieces of material that are joined together. An inner surface 447 of the casing 445 can define a fluid chamber. In one or more arrangements, the bladder 440 and/or fluid chamber can be fluid impermeable.

The bladder 440 can be made of any suitable material. For example, the bladder 440 can be made of an insulating material. The insulating material can be flexible. The insulating material can be a polymer and/or an elastomeric polymer (elastomer). The polymers or elastomers can be natural or synthetic in nature. In one or more arrangements, the insulating material can be silicone rubber. Additional examples of the insulating material include nitrile, ethylene propylene diene monomer (EPDM), fluorosilicone (FVMQ), vinylidene fluoride (VDF), hexafluoropropylene (HFP), tetrafluoroethylene (TFE), perfluoromethylvinylether (PMVE), polydimethylsiloxane (PDMS), natural rubber, neoprene, polyurethane, silicone, or combinations thereof.

A dielectric fluid 430 can be any suitable material. In one or more arrangements, the dielectric fluid 430 can be ethylene glycol. As an additional example, the dielectric fluid 430 can include transformer oil or mineral oil. In one or more arrangements, the dielectric fluid 430 can be a lipid based fluid, such as a vegetable oil-based dielectric fluid.

The dielectric fluid 430 can have various associated properties. The dielectric fluid 430 can have an associated dielectric constant. In one embodiment, the dielectric fluid 430 can have a dielectric constant of 1 or greater, 2 or greater, 3 or greater, 4 or greater, 5 or greater, 6 or greater, 7 or greater, 8 or greater, 9 or greater, 10 or greater, 20 or greater, 30 or greater, 40 or greater, 50 or greater, or higher.

In one or more arrangements, the dielectric fluid 430 can be a fluid that is resistant to electrical breakdown. In one or more arrangements, the dielectric fluid 430, can provide electrical insulating properties. In one or more arrangements, the dielectric fluid 430 can provide electrical insulating properties. In one or more arrangements, the dielectric fluid 430 can prevent arcing between surrounding conductors.

The actuator 400 can include a plurality of conductors. In the example shown in FIGS. 4A-4B, the actuator 400 can include a first conductor 410 and a second conductor 420. The conductors 410, 420 can conduct electrical energy. The conductors 410, 420 can be made of any suitable material, such as a conductive elastomer. In one or more arrangements, the conductors 410, 420 can be made of natural rubber with carbon or other conductive particles distributed throughout the material. The conductors 410, 420 can be made of the same material as each other, or the conductors 410, 420 can be made of different materials. One or more of the conductors 410, 420 can be formed by a single, continuous structure, or one or more of the conductors 410, 420 can be formed by a plurality of separate structures.

The first conductor 410 and the second conductor 420 can be located on opposite sides or portions of the bladder 440. Thus, the first conductor 410 and the second conductor 420 can be separated by the bladder 440. The first conductor 410 and/or the second conductor 420 can be operatively connected to the bladder 440 in any suitable manner. In some instances, the first conductor 410 and/or the second conductor 420 can be embedded within a wall of the bladder 440. In one or more arrangements, the first conductor 410 can be operatively positioned between the bladder 440 and an insulating material. In such case, the first conductor 410 can be substantially encapsulated by the bladder 440 and the insulating material. Also, the second conductor 420 can be operatively positioned between the bladder 440 and an insulating material. In one or more arrangements, the second conductor 420 can be substantially encapsulated by the bladder 440 and the insulating material. In one or more arrangements, the insulating material can be made of an insulating elastomer. Thus, it will be appreciated that, at least in some instances, the insulating material can define exterior surfaces of the actuator 400.

Each of the conductors 410, 420 can be operatively connected to receive electrical energy from a power source. As a result, electrical energy can be selectively supplied to each individual conductors 410, 420.

Figure 4A:
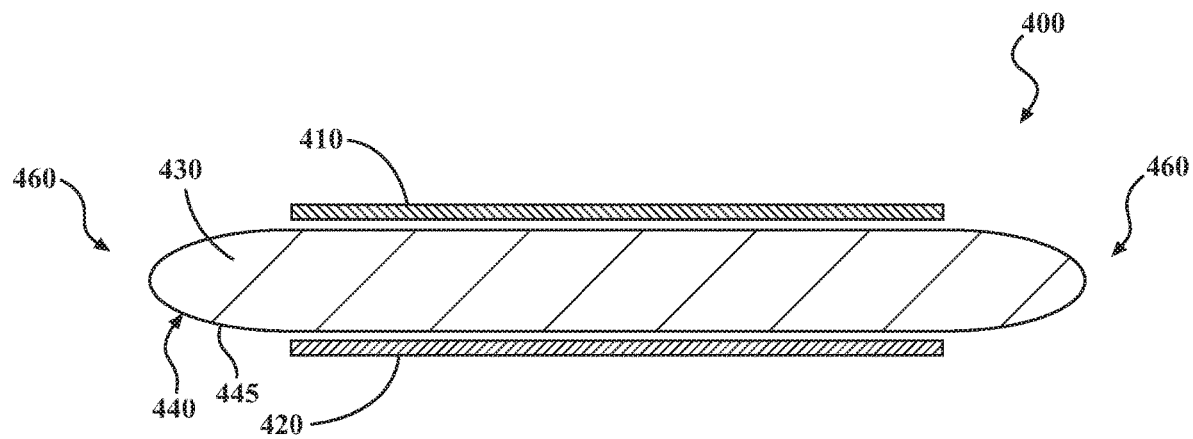
FIG. 4A depicts an example of an actuator, showing a non-actuated condition.

The actuator 400 can have a non-actuated mode and an actuated mode. Each of these modes will be described in turn. FIG. 4A shows an example of a non-actuated mode of the actuator 400. In such case, electrical energy is not supplied to the first conductor 410 and the second conductor 420. Thus, the first conductor 410 and the second conductor 420 can be spaced apart from each other. The bladder 440 can be in a neutral state. A portion of the bladder 440 can extend beyond the outer edges of the first conductor 410 and the second conductor 420.

Figure 4B:
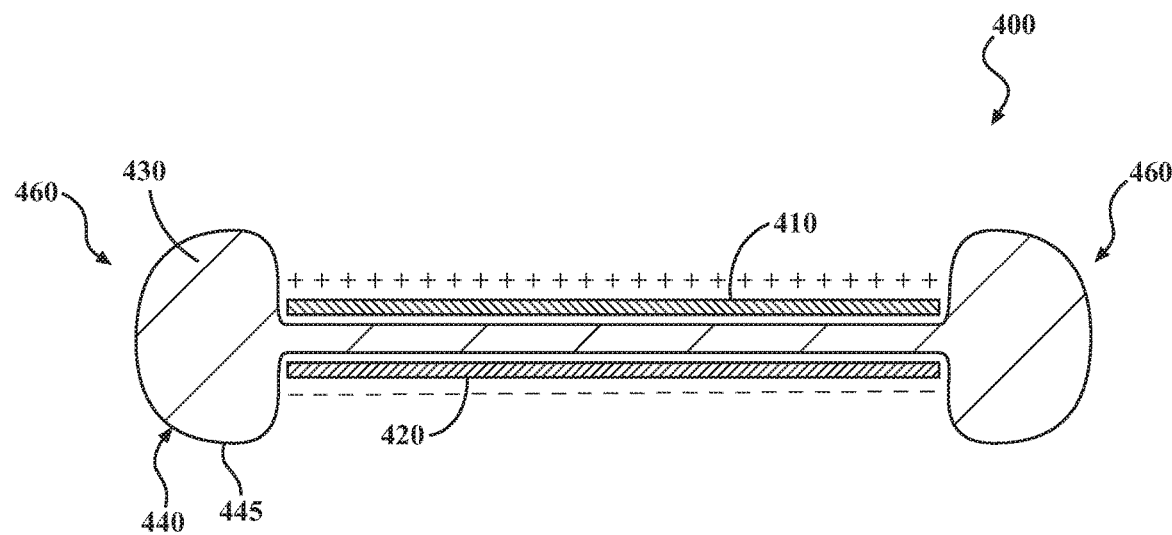
FIG. 4B depicts an example of the actuator, showing an actuated condition.

FIG. 4B shows an example of an actuated mode of the actuator 400. In the actuated mode, power can be supplied to the first conductor 410 and the second conductor 420. In one implementation, the first conductor 410 can become positively charged and the second conductor 420 can become negatively charged. Thus, the first conductor 410 and the second conductor 420 can be oppositely charged. As a result, the first conductor 410 and the second conductor 420 can be attracted toward each other. The attraction between the first conductor 410 and the second conductor 420 can cause them and the respective portions of the bladder 440 to move toward each other. As a result, at least a portion of the dielectric fluid 430 within the fluid chamber can be squeezed toward the outer peripheral region(s) 460 of the bladder 440. In at least some instances, the outer peripheral region(s) 460 of the bladder 440 can bulge, as is shown in FIG. 4B. As the result, the outer peripheral region(s) 460 of the bladder 440 may increase in height (the top to bottom direction on the page).

Figure 5A:
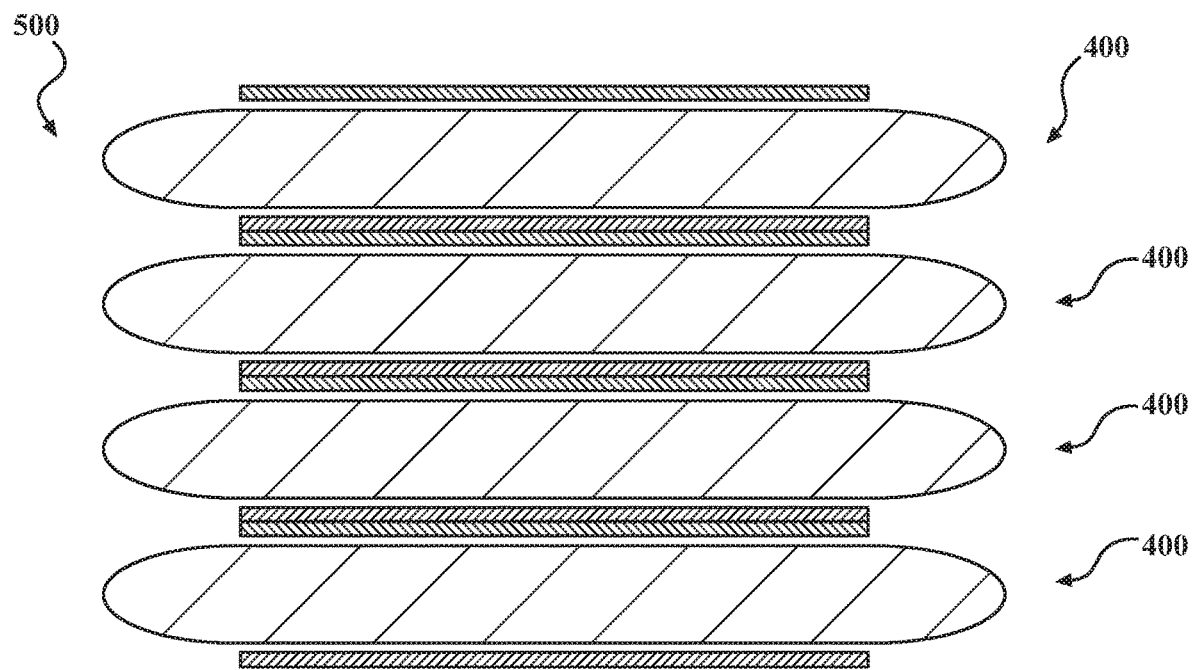
FIG. 5A depicts an example of a plurality of actuators arranged in a stack, showing a non-actuated state.
Figure 5B:
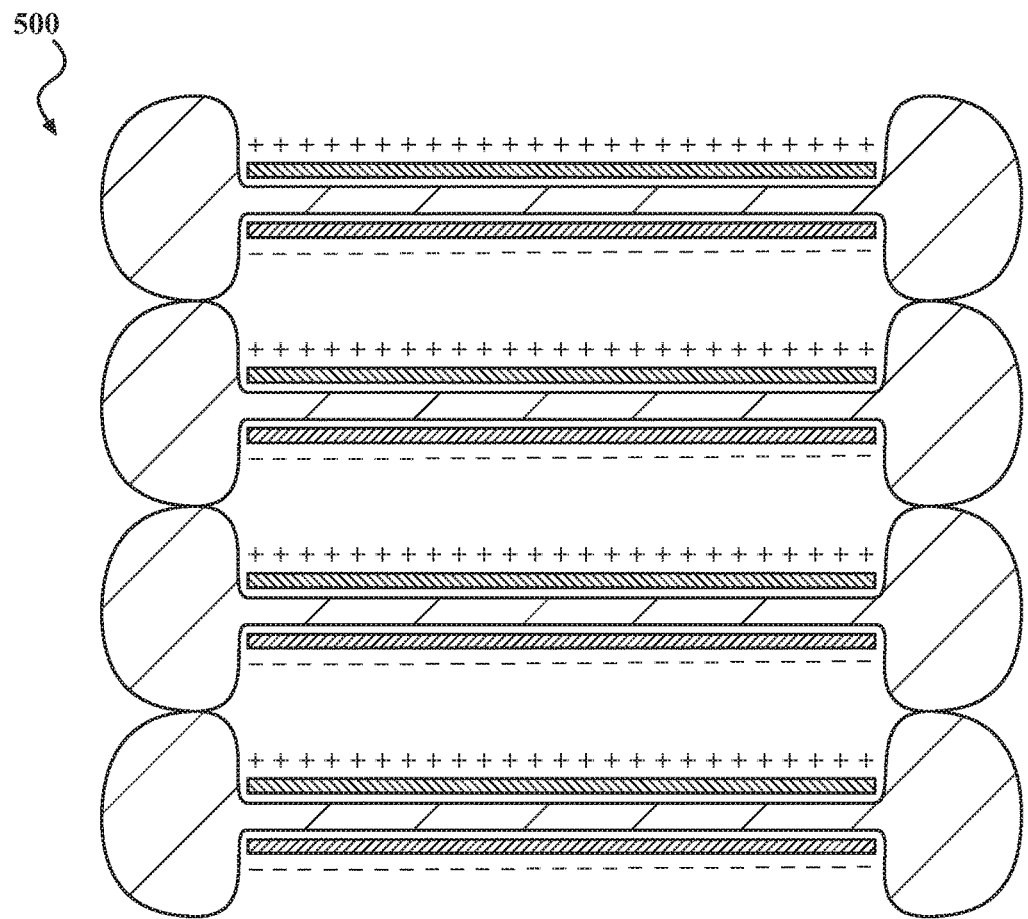
FIG. 5B depicts an example of the plurality of actuators arranged in a stack, showing an actuated state.

FIGS. 5A-5B show an example of an arrangement in which there is a plurality of actuators 400. The actuators 400 can be arranged in a stack 500. FIG. 5A shows the stack 500 in a non-actuated mode. FIG. 5B shows the stack 500 in an actuated mode. The above-description of the actuator 400 in connection with FIGS. 4A-4B applies equally to the individual actuators 400 in the stack 500. It will be appreciated that, in going from the non-actuated mode to the actuated mode, the overall height (the top to bottom direction on the page) of the stack 500 can increase. In such arrangements, it will be appreciated that the actuators 400 in the stack 500 can be actuated individually, collectively, or any combination of two or more of the actuators 400 can be actuated at the same time. In some arrangements, neighboring actuators 400 can be separated by insulating layers.

Now that the various potential systems, devices, elements and/or components of the vehicle 100 have been described, various methods will now be described. Various possible steps of such methods will now be described. The methods described may be applicable to the arrangements described above in relation to FIGS. 1-5, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 6:
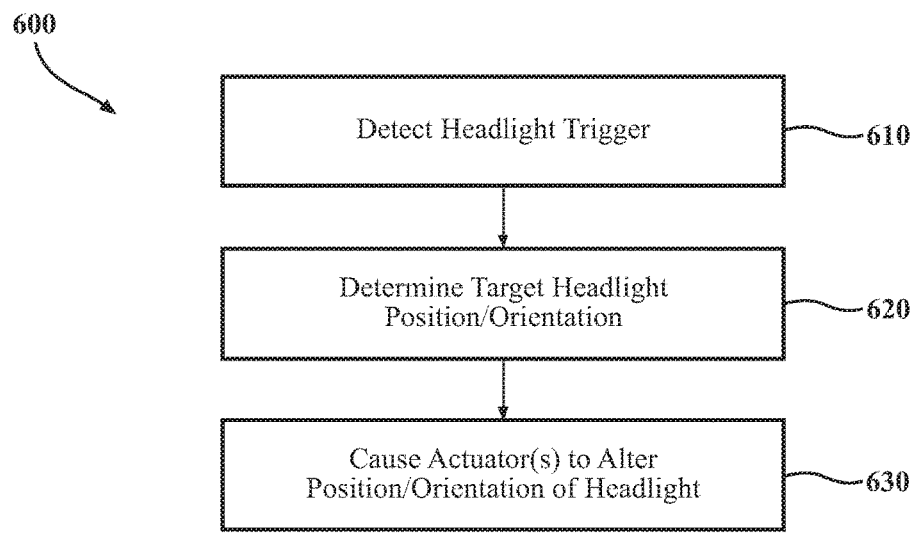
FIG. 6 is an example of a method of adjusting the headlights of a vehicle.

Turning to FIG. 6, an example of a method 600 of adjusting vehicle headlights is shown. At block 610, it can be determined whether a headlight adjustment trigger has been detected. The headlight adjustment trigger can be detected by the object detection module(s) 280, the processor(s) 210, the headlight control system(s) 260, and/or one or more sensor(s) 220. For instance, a headlight adjustment trigger can be detected based on, for example, data acquired by the sensor(s) 220 and/or based on a user input (e.g., a command). Non-limiting examples of the headlight adjustment trigger can include: objects, such as oncoming traffic, a pedestrian, a bicyclist, a stopped car, an emergency vehicle, felled trees and/or power lines, and hazards; merging lanes, such as driveways, exit lanes, intersections, and the like; environmental conditions, such as fog, poor visibility, rain, snow, other precipitation, slippery roads, potholes, and the like; and other useful reasons to control headlights.

If a headlight adjustment trigger is not detected, the method 600 can end, return to block 610, or proceed to some other block. However, if a headlight adjustment trigger is detected, then the method can proceed to block 620.

At block 620, responsive to detecting a headlight adjustment trigger, a target headlight position or orientation can be determined based on the headlight trigger. Such a determination can be made by, for example, the processor(s) 210 and/or the headlight control system(s) 260.

At block 630, one or more actuators can be caused to actuate so as to alter a position or orientation of the headlight to the target headlight position or orientation. Such causing can be implemented in any suitable manner. For instance, in one or more arrangements, the processor(s) 210 and/or the headlight control system(s) 260 can activate one or more actuators 400 by allowing electrical energy from a power source to be supplied to the actuator(s) 400.

After block 630, the method 600 can end. Alternatively, the method 600 can return to block 610 or some other block. The method 600 can be performed continuously, periodically, irregularly, randomly, or responsive to a condition, event, or input.

Figures 7A, 7B:
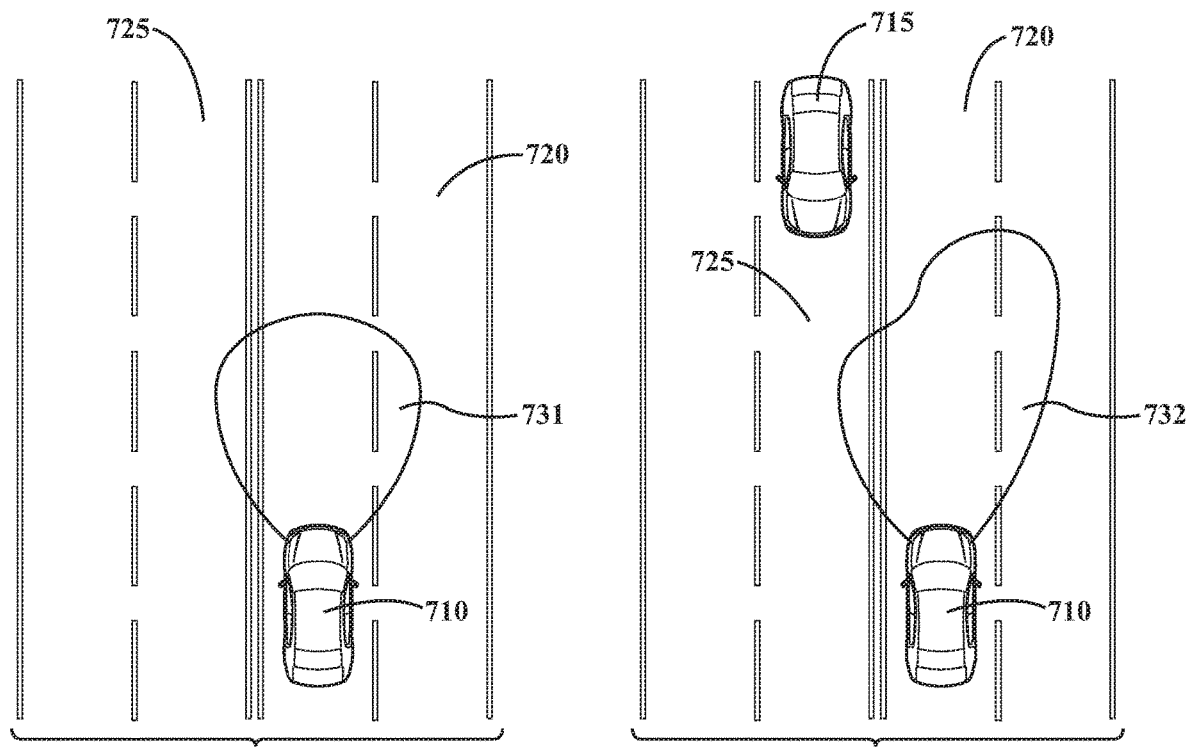
FIGS. 7A-7D depict a scenario in which the headlights of a vehicle are adjusted.

A non-limiting example of the use of arrangements described herein will be described in connection with FIGS. 7A-7D. In FIG. 7A, a vehicle 710 can be traveling on a road in a travel lane 720. An illumination pattern 731 of the headlights of the vehicle 710 can be relatively wide showing a broad field in front of the vehicle 710.

In FIG. 7B, another vehicle 715 can approach from the opposite direction in travel lane 725. The vehicle 710 can detect the other vehicle 715, such as by one of the environment sensors 224. The vehicle 710 can identify the object as a vehicle. The vehicle 710 can track the other vehicle 715. The vehicle 710 can send commands to the headlight control system 260. The headlight control system 260 can determine that the illumination pattern of the headlights should be altered so as to be out of the way of the opposing vehicle 715 so not to blind its driver. For instance, the headlight control system 260 can activate the actuators 330 to cause the position and/or the orientation of the left headlight of the vehicle 710 to be altered. For instance, the left headlight can rotate or tilt downward. Alternatively or in addition, the left headlight can tilt or rotate to the right. Thus, a new illumination pattern 732 can be achieved.

Figure 7C:
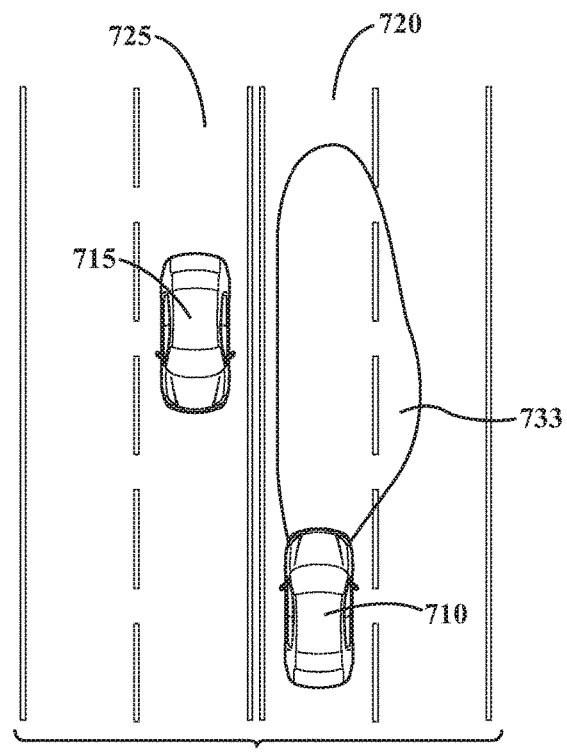

In FIG. 7C, as the vehicle 715 and the vehicle 710 come closer together, the headlight control system(s) 260 can activate the actuators 330 to cause the position and/or the orientation of the left headlight of the vehicle 710 to be altered to create a new illumination pattern 733, which may result in little or no light from the left headlight being in the opposing travel lane 725. For instance, the left headlight can tilt or rotate to the right.

Figure 7D:
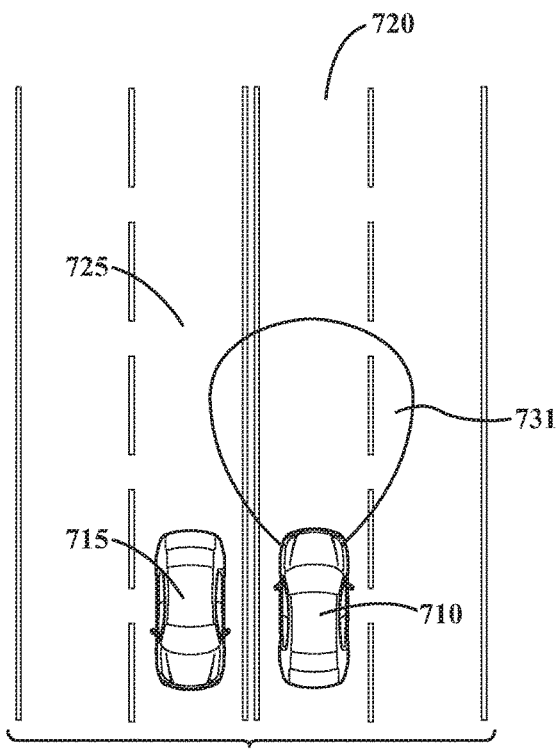

In FIG. 7D, once object tracking module(s) 282 determines that the vehicle 710 has passed the opposing vehicle 715, then headlight control system(s) 260 can activate the actuators 330 to cause the position and/or the orientation of the left headlight of the vehicle 710 to be altered. In this example, the illumination pattern can be changed back into the illumination pattern 731 shown in FIG. 7A.

It will be appreciated that, when multiple cars are present, all relevant vehicles will be tracked, and beam projections will be calculated to prevent any of the vehicles from being blinded, provided that sufficient light can be cast in front of vehicle 710. In this way, headlights can create sophisticated beam patterns to avoid blinding oncoming traffic while still partially illuminating areas toward oncoming traffic when able.

Figure 8A:
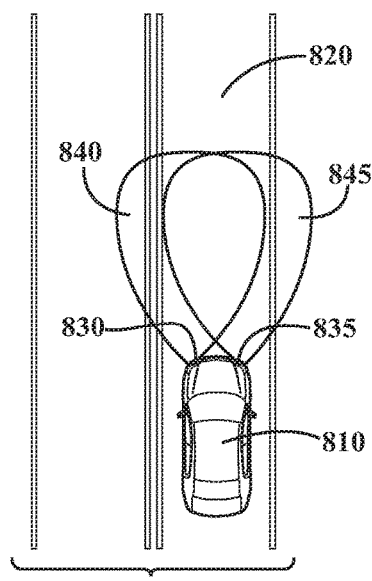
FIGS. 8A-8B depict another scenario in which the headlights of a vehicle are adjusted.

Another non-limiting example of the use of arrangements described herein will be described in connection with FIGS. 8A-8B. In FIG. 8A, a vehicle 810 can be traveling on a road in a travel lane 820. An illumination pattern of the headlights of the vehicle 710 can be created by both headlights 830, 835 with the left headlight beam 840 and right headlight beam 845 overlapping.

Figure 8B:
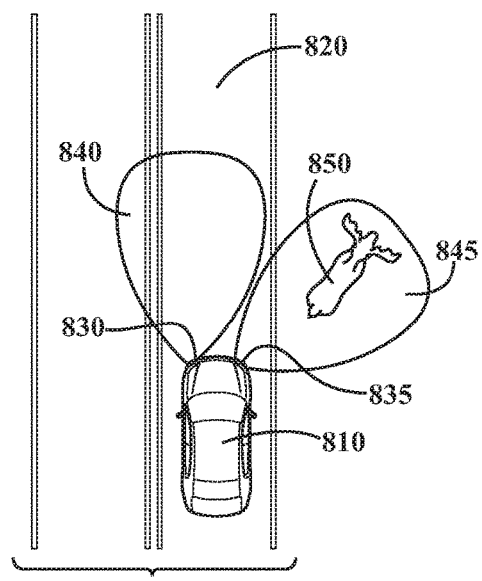

In FIG. 8B, the vehicle 810 can detect an animal 850 on the side of the road, such as by one or more of the environment sensors 224. In some instances, the vehicle 810 can identify the object as an animal. The vehicle 810 can track the animal 850. The vehicle 810 can alert the driver. For instance, the alert module(s) 243 can warn the driver that an animal was detected, such as by a visual, audible, and/or haptic alert.

The vehicle 810 can send commands to the headlight control system 260. The headlight control system 260 can determine that the illumination pattern of the headlights should be altered so as to illuminate the animal 850. For instance, the headlight control system 260 can activate the actuators 330 to cause the position and/or the orientation of the left headlight of the vehicle 810 to be altered. For instance, the right headlight 835 can rotate or tilt to the right. Thus, the right headlight 835 can act as a spotlight on the animal 850. This arrangement can continue until the vehicle 810 passes the animal 850. At that point, the right headlight 835 can return to a prior or default position/orientation.

It will be appreciated that arrangements described herein can provide numerous benefits, including one or more of the benefits mentioned herein. For example, arrangements described herein can facilitate changing the illumination patterns created by headlights. Arrangements described herein can illuminate in a vehicle's intended path without blinding oncoming traffic. Arrangements described herein can autonomously track animals, pedestrians, bicyclists, or other moving objects in the external environment and can control the position and/or the orientation of the headlights of the vehicle accordingly. Arrangements described herein can allow for individual headlights to be adjusted independently, where each headlight can perform a different function or track a different object. Arrangements described here can avoid the use of complicated gears and actuators. Arrangements described herein can enable more compact designs and packaging for actuators. Arrangements described herein can provide for more efficient use of power.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A headlight assembly comprising:
   a headlight; and
   at least one actuator including:
      a bladder, the bladder including a flexible casing and defining a fluid chamber, the fluid chamber including a dielectric fluid; and
      a first conductor and a second conductor operatively positioned on opposite portions of the bladder,
   the at least one actuator being configured such that, when electrical energy is supplied to the first conductor and the second conductor, the first conductor and the second conductor have opposite charges, whereby the first conductor and the second conductor are electrostatically attracted toward each other, the first conductor and the second conductor move toward each other to cause at least a portion of the dielectric fluid to be displaced to an outer peripheral region of the fluid chamber, thereby causing the outer peripheral region of the bladder to bulge such that a height of the bladder increases,
   the at least one actuator being operatively positioned to cause a position and/or an orientation of the headlight to be adjusted based on changes in the height of the bladder.

2. The headlight assembly of claim 1, wherein the at least one actuator is a plurality of actuators.

3. The headlight assembly of claim 1, wherein the at least one actuator is configured for yaw adjustment of the headlight.

4. The headlight assembly of claim 1, wherein the at least one actuator is configured for pitch adjustment of the headlight.

5. The headlight assembly of claim 1, further including a base, wherein the headlight is operatively connected to one side of the base and the at least one actuator is operatively connected to an opposite side of the base.

6. The headlight assembly of claim 5, wherein the at least one actuator is configured to control the position and/or the orientation of the base on a plurality of different axes.

7. The headlight assembly of claim 5, wherein the at least one actuator is operatively connected to a corner region of the base.

8. The headlight assembly of claim 5, wherein the at least one actuator includes a plurality of actuators, and wherein the plurality of actuators are arranged in a stack.

9. A headlight system comprising:
   a headlight;
   a base, the headlight being operatively connected to the base;
   at least one actuator operatively connected to the base, the at least one actuator including a bladder, the bladder including a flexible casing and defining a fluid chamber, the fluid chamber including a dielectric fluid, the at least one actuator including a first conductor and a second conductor operatively positioned on opposite portions of the bladder,
   the at least one actuator being operatively positioned to adjust a position or an orientation of the headlight based on changes in a height of the bladder; and
   a power source operatively connected to supply electrical energy to the first conductor and the second conductor; and
   one or more processors operatively connected to selectively control a supply of electrical energy from the power source to the first conductor and the second conductor,
   the at least one actuator being configured such that, when electrical energy is supplied to the first conductor and the second conductor, the first conductor and the second conductor have opposite charges, whereby the first conductor and the second conductor electrostatically attract each other, the first conductor and the second conductor move toward each other to cause at least a portion of the dielectric fluid to be displaced to an outer peripheral region of the fluid chamber thereby causing the outer peripheral region of the bladder to bulge such that the height of the bladder increases.

10. The headlight system of claim 9, wherein the one or more processors are configured to automatically adjust a position and/or an orientation of the headlight.

11. The headlight system of claim 9, further including an input interface operatively connected to the one more processors, wherein the one or more processors are configured to selectively control the supply of electrical energy from the power source to the first conductor and the second conductor based on inputs received on the input interface, whereby a position and/or an orientation of the headlight is adjusted based on inputs received on the input interface.

12. The headlight system of claim 9, further including one or more sensors operatively connected to the one or more processors, wherein the one or more processors are configured to selectively control the supply of electrical energy from the power source to the first conductor and the second conductor based on sensor data acquired by the one or more sensors, whereby a position and/or an orientation of the headlight is adjusted based on sensor data acquired by the one or more sensors.

13. A method of adjusting a position and/or an orientation of a headlight assembly, the headlight assembly includes a headlight and at least one actuator, the at least one actuator including a bladder, the bladder including a flexible casing and defining a fluid chamber, the fluid chamber including a dielectric fluid, the at least one actuator including a first conductor and a second conductor operatively positioned on opposite portions of the bladder, the at least one actuator being configured such that, when electrical energy is supplied to the first conductor and the second conductor, the first conductor and the second conductor have opposite charges, whereby the first conductor and the second conductor are electrostatically attracted toward each other, the first conductor and the second conductor move toward each other to cause at least a portion of the dielectric fluid to be displaced to an outer peripheral region of the fluid chamber, thereby causing the outer peripheral region of the bladder to bulge such that a height of the bladder increases, the at least one actuator being operatively positioned to adjust a position and/or an orientation of the headlight based on changes in the height of the bladder, the method comprising:
   detecting a headlight trigger;
   responsive to detecting the headlight trigger, determining a target headlight position or orientation based on the headlight trigger; and
   causing the at least one actuator to actuate to alter a position or orientation of the headlight to the target headlight position or orientation based on changes in the height of the bladder.

14. The method of claim 13, wherein the at least one actuator is a plurality of actuators, and wherein each actuator is independently actuated to control the position and/or the orientation of the headlight assembly.

15. The method of claim 14, wherein different control signals are applied to different actuators to achieve nonuniform states for the plurality of actuators.

16. The method of claim 13, wherein the at least one actuator is configured for a yaw adjustment of the headlight.

17. The method of claim 13, wherein the at least one actuator is configured for a pitch adjustment of the headlight.

18. The method of claim 13, further including a base, wherein the headlight is operatively connected to the base, and wherein the at least one actuator is operatively connected to the base.

19. The method of claim 18, wherein the at least one actuator is a plurality of actuators, and wherein each actuator is operatively connected to a corner region of the base.

20. The method of claim 13, wherein the at least one actuator is a plurality of actuators, and wherein the plurality of actuators are arranged in a stack.

\* \* \* \* \*